United States Patent [19]
Michel

[11] Patent Number: 4,955,718
[45] Date of Patent: Sep. 11, 1990

[54] PHOTOELECTRIC MEASURING SYSTEM WITH INTEGRATED OPTICAL CIRCUIT INCLUDING AND ILLUMINATING SYSTEM

[75] Inventor: Dieter Michel, Traunstein, Fed. Rep. of Germany

[73] Assignee: Dr. Johannes Heidenhain GmbH, Traunreut, Fed. Rep. of Germany

[21] Appl. No.: 148,556

[22] Filed: Jan. 26, 1988

[30] Foreign Application Priority Data

Jan. 27, 1987 [DE] Fed. Rep. of Germany ....... 3702314

[51] Int. Cl.$^5$ .............................................. G01B 9/02
[52] U.S. Cl. .................................... 356/356; 356/354; 250/237 G; 350/96.12
[58] Field of Search ............... 356/353, 354, 355, 356, 356/358; 250/237 G, 231 SE; 350/96.12, 96.15, 96.17, 96.19

[56] References Cited

U.S. PATENT DOCUMENTS

| | | | |
|---|---|---|---|
| 3,900,264 | 8/1975 | Heitmann et al. | 356/356 |
| 4,286,838 | 9/1981 | Huignard et al. | 350/96.12 |
| 4,629,886 | 12/1986 | Akiyama et al. | |
| 4,717,255 | 1/1988 | Ulbers | 350/96.12 |
| 4,743,083 | 5/1988 | Schimpe | 350/96.12 |
| 4,746,186 | 5/1988 | Nicia | 350/96.12 |

FOREIGN PATENT DOCUMENTS

| | | |
|---|---|---|
| 0006482 | 1/1980 | European Pat. Off. |
| 3316144 | 11/1983 | Fed. Rep. of Germany |
| 3427047 | 3/1985 | Fed. Rep. of Germany |
| 59-164914 | 9/1984 | Japan |
| 1270875 | 4/1972 | United Kingdom |
| 2146765 | 4/1985 | United Kingdom |

OTHER PUBLICATIONS

"Theory of Prism-Film Coupler and Thin-Film Light Guides", J. Optical Soc. of America, vol. 60, (1970) pp. 1325-1337, Tien, et al.

"3×2 Channel Waveguide Gyroscope Couplers: Theory" Burns et al, Journal of Quantum Electronics, 10-1982, pp. 1790-1796.

*Primary Examiner*—Vincent P. McGraw
*Assistant Examiner*—S. A. Turner
*Attorney, Agent, or Firm*—Willian Brinks Olds Hofer Gilson & Lione

[57] ABSTRACT

A photoelectric measuring system measures relative movements between a diffraction grid and a substrate. An integrated semiconductor laser is formed on the substrate and emits radiation that is conducted via an optical waveguide and a focusing grating coupler onto the diffraction grid. The diffraction grid diffracts the incident radiation and directs it back onto the substrate. Diffracted component beams are received by waveguide horns having waveguide corrugation coupling gratings and are conducted via optical waveguides to a coupler, where the component beams are brought into interference to form a combined beam. This combined beam is transmitted from the coupler via optical waveguides to detectors which transform the combined beams into electrical signals that are displaced in phase with respect to one another. The electrical signals generated by the detectors can be processed in an evaluating circuit which may also be formed as an integrated circuit on the substrate, and then displayed. All of the elements from the semiconductor laser to the detectors are formed on the substrate as an integrated optical circuit.

6 Claims, 4 Drawing Sheets

PHOTOELECTRIC MEASURING SYSTEM WITH INTEGRATED OPTICAL CIRCUIT INCLUDING AND ILLUMINATING SYSTEM

BACKGROUND OF THE INVENTION

This invention relates to a photoelectric measuring system of the type which comprises a substrate, an integrated optical circuit on the substrate, and at least one diffraction grid shiftable with respect to the substrate in a direction transverse to a beam axis, wherein the integrated optical circuit includes two optical waveguides, two waveguide horns, each configured to couple a respective diffracted component beam from the diffraction grid to a respective one of the optical waveguides, a coupler configured to receive the diffracted partial beams from the optical waveguides and to bring the diffracted component beams into interference to form a combined beam, and at least one detector positioned to respond to the combined beam and to generate at least one electrical signal in response to the combined beam.

In the last few years there has been substantial progress in the development of velocity and position measuring systems. Such measuring systems have been developed for both process and testing applications, and they utilize optical, magnetic, and other sensing techniques in combination with suitable electronic circuits. Measuring devices in which light is used for the measuring standard are known as optical interference measuring devices, and in these devices it is the wavelength of monochromatic light such as laser light that is used as the reference magnitude. The accuracy of these measuring devices is suitable for current industrial technology, but in many cases the obtainable high precision of measurement requires a large economic expenditure.

Measuring devices have been proposed in which an illuminating system and a receiver are arranged on a common conductor plate. See for example German DE-OS 34 27 047.

In many applications such as those involving machine tools, for example, a measuring device is required having a mean accuracy which lies between the high accuracy of optical interference measuring devices described above and the lower accuracy of magnetic measuring systems. For these applications an optical diffraction grid can be used, and in such systems the grid constant of the diffraction grid typically is on the order of a few microns. Such measuring devices represent a compromise between high accuracy and acceptable expenses. Such devices are described for example in German DE-OS 33 16 144 and in Japanese unexamined patent specification JP-OS 59-164 914.

In such devices the diffraction grid itself defines the reference magnitude. A diffraction grid is made up of very thin grid lines which lie closely adjacent to one another on a glass or metal plate and are formed by any of a variety of mechanical processing techniques, photolithographic techniques, electron beam lithography techniques, or the like. Such systems also include the following: a light source that emits monochromatic light (for example laser light), two reflector mirrors, and a detector positioned on the side opposite the light source to receive interference light. The light beam emitted by the light source is diffracted by the diffraction grid and passed. A light beam diffracted by the diffraction grid includes diffracted light (a diffraction component beam) of the N-th order. Under the influence of the diffraction grid there is obtained in the wavefront of the light a value $N\rho$, the product of the order number and the phase. The light beam that runs rectilinearly through the diffraction grid contains no phase information. The two light beams are reflected from the reflector mirrors and return along the outward path to enter the diffraction anew and to be diffracted and passed through by the diffraction grid. The passed light of the one light beam and the diffraction light of N-th order the other light beam are spatially selected so as to interfere with one another and enter a detector. In the diffracted light of N-th order of the second light beam, the value $-N\rho$ of the opposite sign is obtained through the phase of the diffraction grid, while in the passed light of the first light beam only the previously arisen phase $N\rho$ is present. For this reason, the interference light corresponds to $2N\rho$ which corresponds to twice the amount of the phase of the diffraction grid. If therefore one assumes that the diffraction grid moves with respect to another part of the optical system (for example with respect to the light source and the reflector mirrors) then the interference light moves over two N periods when the diffraction grid moves over one period.

In another known arrangement, the light beam emitted from the light source is diffracted by the diffraction grid and component beams of the same order with different signs overlap and interfere with one another, as a semipermiable mirror or the like is provided before the light enters the detector. In this way by reason of the phase of the diffraction grid in the diffracted light beams, there is obtained the magnitudes $N\rho$ and $-N\rho$, in which N is the diffraction order number. Therefore, the interference light is obtained with a value $2N\rho$, an amount equal to twice the phase of the diffraction grid. If, therefore, one then again assumes that the diffraction grid and another part of the optical system are moved relative to one another, as explained above, then the interference light moves 2N periods while the diffraction grid moves over one period.

In order to make it possible to accommodate the optical system described above in a small space, it is necessary to compensate for the angle of the light beams with respect to the diffraction grid. If in this case, however, the relative position of the optical system with respect to the diffraction grid is shifted in the direction of the grid lines of the diffraction grid, there occurs a phase change that is similar to the phase change that arises when relative movement occurs perpendicularly to the plane of the diffraction grid. For this reason, the measuring accuracy is relatively low. If the light beam is incident on the diffraction grid perpendicularly, then the above explained disadvantage is avoided, but the optical system becomes extensive so that at a relatively large amount of space must be provided.

U.S. patent application Ser. No. 07/077,190 (corresponding to German Patent Application P 36 25 327.8-82) describes a position measuring system which is simple in construction and yet which substantially avoids undesirable environmental influences on the measuring device so that dependable operation is provided. The device described in this patent application provides the advantage of a compact construction with integration capability and security from interference from environmental influences.

The present invention is directed to an improved measuring system of the general type described above which forms components in such a way as to yield a higher degree of integration.

SUMMARY OF INVENTION

According to this invention, a photoelectric measuring system of the type described initially above is provided with an illuminating system comprising means for generating an optical beam and for directing the optical beam along the beam axis at the diffraction grid. According to this invention, this generating and directing means is formed as a part of the integrated optical circuit on the substrate, along with the waveguides, waveguide horns, coupler and detector described above. The dependent claims define particularly advantageous approaches to implementing the invention defined by Claim 1.

Presently preferred embodiments of this invention are explained below with the aid of drawings. In the drawings, geometrical relationships are not drawn to scale, but are rather depicted with exaggerated features so that the points being discussed will be perceptible to the unaided eye. The specialist in the field of integrated optics with knowledge of the invention will be able to convert the dimensions and positional allocations of the drawings directly into practice. For the same reason, the beam paths and diffraction grids are not represented with precise optical dimensions, but are rather depicted symbolically.

The invention itself, together with further objects and attendant advantages, will best be understood by reference to the following detailed description, taken in conjunction with the accompanying drawings.

DETAILED DESCRIPTION OF THE PRESENTLY PREFERRED EMBODIMENTS

Figure 1:
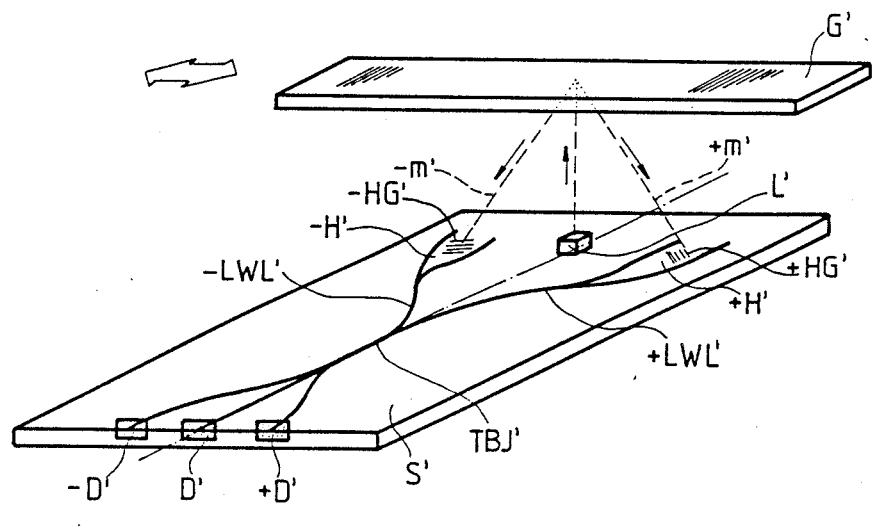
FIG. 1 depicts a photoelectric measuring system which incorporates a first preferred embodiment of this invention and includes an integrated semiconductor laser.

Turning now to the drawings, FIG. 1 shows a first presently preferred embodiment of a position measuring system which includes a diffraction grid G', the position of which is to be measured relative to a substrate S'.

This embodiment includes a semiconductor laser L' which generates a beam of optical radiation that is directed against the diffraction grid G'. The diffraction grid G' diffracts the incident optical beam to form component beams +m' and −m' of like diffraction order, but opposite sign. According to this invention, the semiconductor laser L' is formed as a component of an integrated optical circuit, and is therefore arranged directly upon the substrate S'. In this embodiment the beam of optical radiation is directed against the diffraction grid G' along a beam axis that is perpendicular to the plane of the diffraction grid.

The component beams +m', −m' fall upon the substrate S'. On the substrate S' are mounted two waveguide horns +H', −H'; two optical waveguides +LWL', −LWL'; an optical coupler TBJ'; as well as three photodetectors +D', D', −D'. In this embodiment, all of these elements are formed as a single integrated optical circuit on the substrate S'. Preferably, the substrate S' also includes an evaluating electronic system, along with a display (not shown).

In this embodiment of the waveguide horns +H', −H' are constructed in the form of so-called adiabatic horns. The waveguide horns +H', −H' include waveguide corrugation coupling gratings +HG', −HG', and the orientations of these gratings are governed according to the geometry and other coupling parameters of the diffracted component beams +m', −m'.

The coupler TBJ' can be laid out in such a way that three signals are provided on its three outputs, and these three signals are phase displaced with respect to one another. These three signals may be phase shifted with respect to one another in each case through 120°, but it is also possible for signals to be provided at two outputs of the coupler TBJ' that represent sine and cosine functions, in which case a reference signal is provided at the third output. The optical signals on the outputs are conducted by means of optical waveguides to the detectors +D', D', −D', where they are transformed into electrical signals applied to an electronic evaluating circuit. Preferably the evaluating circuit is a component of the integrated optical circuit but is not shown in FIG. 1.

The radiation source L' can be provided with a planar lens such as a planar gradient index lens GL'. See *Applied Optics*, Vol. 25, No. 19, October, 1986, pp. 3388–3396 and Naumann, Helmut: *Bauelement der Optik: Taschenbuch Fur Konstrukteure* ("Components of Optics' Handbook for Designers"), H. Naumann, G. Schroder, Fourth Revised and Expanded Edition, Munich, Vienna, Hanser, 1983, pp. 545–548. Alternately, planar Fresnel lens or zone lens can also be used.

Figure 2:
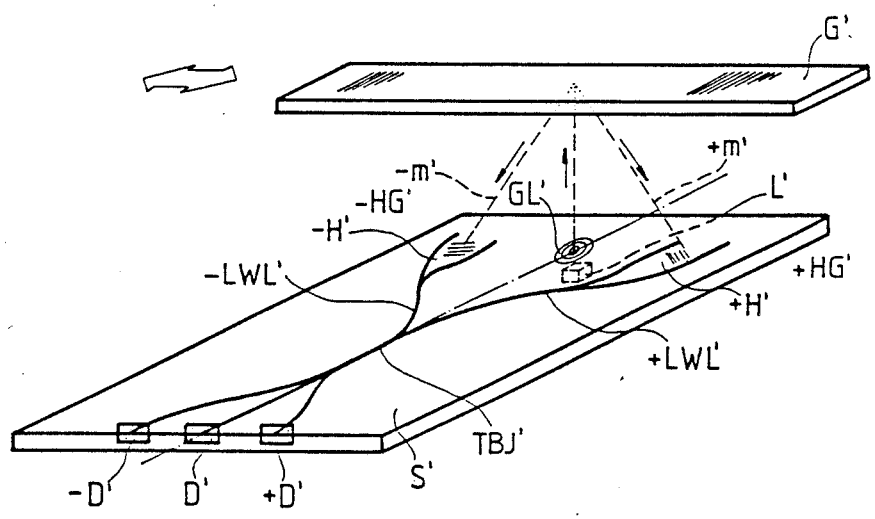
FIG. 2 depicts a second preferred embodiment of this invention which includes an integrated semiconductor laser and a planar micro-lens.

Such a variant is shown in FIG. 2. In order not to confuse this description, similar components in the various figures are identified with the same reference symbols. In each case, it is only differing components that are provided with additional reference symbols.

Figure 3:
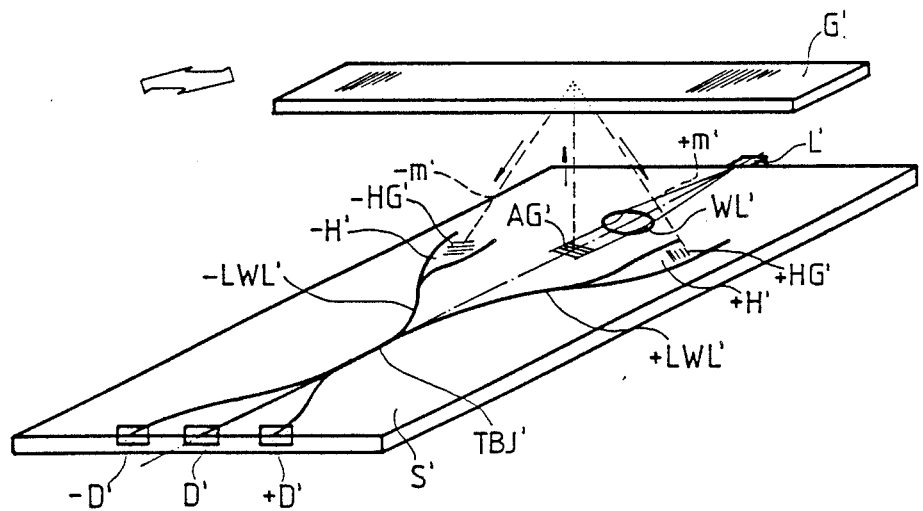
FIG. 3 depicts a third preferred embodiment of this invention which includes an integrated semiconductor laser and a geodetic lens.

FIG. 3 shows a third embodiment in which the semiconductor laser L' is integrated on the substrate S', and the radiation produced by the semiconductor laser L' is deflected by means of a geodetic lens WL' and a focusing grating coupler AG' onto the diffraction grid G'. Such a geodetic lens is described for example in the publication "*Laser und Optoelektronik*" No. 4, 1986, p. 331.

Figure 4:
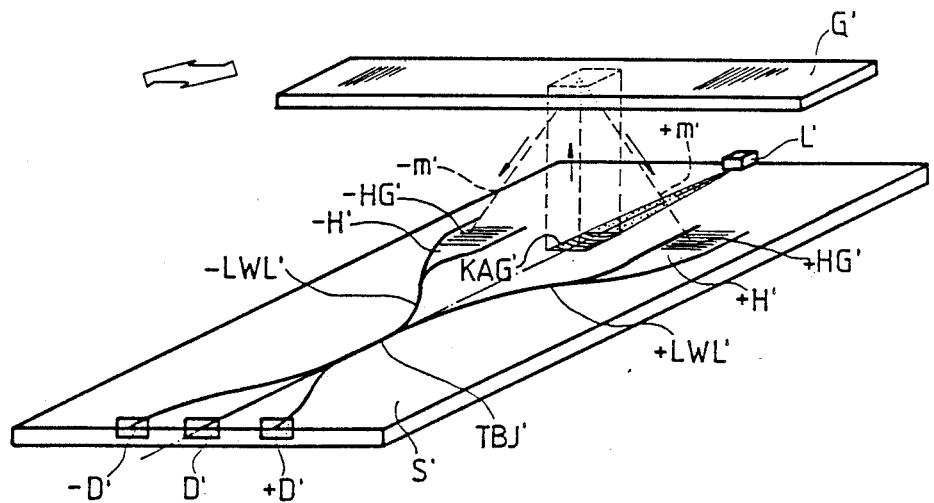
FIG. 4 depicts a fourth preferred embodiment of this invention which includes an integrated semiconductor laser and a collimating focusing grating coupler.

FIG. 4 shows a fourth embodiment which includes an integrated semiconductor laser L', which generates optical radiation which is directed with the aid of a collimating focusing grating coupler KAG' upon the diffraction grid G'.

Collimating focusing grating couplers are known in integrated optical circuits, as described for example in interferometric length measuring systems. See the publication entitled "*Integrated Optic Sensors Using Grating Components*" p. 74 by S. Ura, T. Suhara, and H. Nishihara (Fourth International Conference on Optical Fiber Sensors, Tokyo, Japan, October 1986).

In each of the four embodiments described above shifting movements of the diffraction grid G' in the direction of the arrow are converted into generally digitally displayed position or velocity measurement values for the machine movement to be measured. In the event that no direction of movement has to be detected (as for example in the case of velocity measurements) the generation of phase shifted signals at the detectors D', −D', +D' can be omitted.

By mounting the illuminating arrangement on the same integrated optical circuit as the detecting arrangement important advantages are provided in terms of small size, excellent reliability and manufacturability.

Of course, it should be understood that a wide range of changes and modifications can be made to the preferred embodiments described above. It is therefore intended that the foregoing detailed description be regarded as illustrative rather than limiting, and that it be understood that it is the following claims, including all equivalents, which are intended to define the scope of this invention.

I claim:

1. In a photoelectric measuring system of the type which comprises a substrate, an integrated optical circuit on the substrate, and at least one diffraction grid shiftable with respect to the substrate in a direction transverse to a beam axis, wherein the integrated optical circuit comprises: at least two optical waveguides, coupling-in elements each configured to couple a respective diffracted component beam from the diffraction grid to a respective one of the optical waveguides, a coupler configured to receive the diffracted partial beams from the optical waveguides and to bring the diffracted component beams into interference to form a combined beam, and at least one detector positioned respond to the combined beam and to generate at least one electrical signal in response to the combined beam; the improvement comprising:

an illuminating system comprising means for generating an optical beam and means for directing the optical beam along the beam axis at the at least one diffraction grid, said generating and directing means formed as a part of the integrated optical circuit on the substrate.

2. The invention of claim 1 wherein the means for generating an optical beam comprises a semiconductor laser formed as a part of the integrated optical circuit on the substrate.

3. The invention of claim 1 wherein the means for directing the optical beam comprises a planar lens formed as a part of the integrated optical circuit on the substrate.

4. The invention of claim 1 wherein the means for directing the optical beam comprises a geodetic lens and a focusing grating coupler formed as a part of the integrated optical circuit on the substrate.

5. The invention of claim 1 wherein the means for directing the optical beam comprises a collimating focusing grating coupler formed as a part of the integrated optical circuit on the substrate.

6. The invention of claim 1 wherein the coupling-in elements comprise waveguide horns.

* * * * *

UNITED STATES PATENT AND TRADEMARK OFFICE
CERTIFICATE OF CORRECTION

PATENT NO. : 4,955,718

DATED : September 11, 1990

INVENTOR(S) : Dieter Michel

It is certified that error appears in the above-identified patent and that said Letters Patent is hereby corrected as shown below:

On the title page, item [54] and in column 1, in the third line of the title of the invention, please delete "AND" and substitute therefor --AN--.

In column 2, line 29, please delete "semipermiable" and substitute therefor --semipermeable--.

In column 4, line 61, please delete "p. 74" and substitute therefor --p. 174--.

UNITED STATES PATENT AND TRADEMARK OFFICE
CERTIFICATE OF CORRECTION

PATENT NO. : 4,955,718

DATED : September 11, 1990

INVENTOR(S) : Dieter Michel

It is certified that error appears in the above-identified patent and that said Letters Patent is hereby corrected as shown below:

```
     In column 6, line 1, after "positioned" please insert
--to--.
```

Signed and Sealed this

Eleventh Day of August, 1992

*Attest:*

DOUGLAS B. COMER

*Attesting Officer*      *Acting Commissioner of Patents and Trademarks*